United States Patent Office 3,822,247
Patented July 2, 1974

3,822,247
QUATERNIZED 1 - METHYL - 2 - PHENYL - 3-INDOLYLAZO-GUANAZOLYL-AZO - 1-METHYL-2-PHENYL-3-INDOLES
Minoru Ozutsumi, Shigeo Maeda, and Yoshinori Kawada, Kitaku, Tokyo, Japan, assignors to Hodogaya Chemical Industry Co., Ltd., Tokyo, Japan
No Drawing. Filed Apr. 15, 1970, Ser. No. 28,953
Claims priority, application Japan, May 15, 1969, 44/36,193
Int. Cl. C09b 35/34; D06p 3/76
U.S. Cl. 260—157                 6 Claims

ABSTRACT OF THE DISCLOSURE

Basic disazo dyes which are useful for dyeing polyacrylonitrile fiber characterized by the formula:

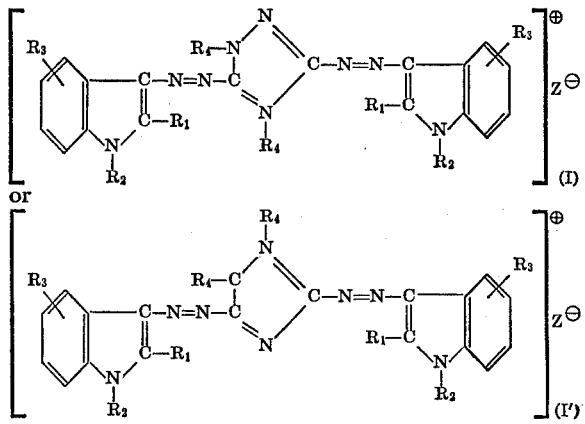

wherein $R_1$ is a lower alkyl radical or a substituted or non-substituted phenyl; $R_2$ represents a hydrogen atom or a lower alkyl radical; $R_3$ represents a hydrogen or halogen atom or a lower alkyl or lower alkoxy radical; $R_4$ represents a lower alkyl or a benzyl radical; $Z^\ominus$ represents an anion which dyes color said polyacrylonitrile fibers in various brilliant shades of red which are characterized by high fastness to sunlight, good wash resistance, good rub resistance and good heat stability.

BACKGROUND OF THE INVENTION

This invention relates to a group of novel disazo dyes which are useful for coloring fibers, and especially polyacrylonitrile type fibers, and further this invention relates to processes for producing said dyes.

It has been known that various types of basic dyes can be produced by quaternizing the corresponding nitrogen containing compound. For example, in U.S. Pat. 3,133,-910, there is disclosed a technique for producing basic triazol disazo dyes. In this techniques, monoazo dyes are produced at first by coupling 3-amino-1,2,4-triazol, the first diazo component, with a primary amine, the first azo component and then the obtained monoazo compound is diazotized and coupled with a second azo component, and finally the obtained disazo dye is quaternized. In British Pat. 1,117,734, it has been disclosed that basic dyes of guanazole derivatives using 1-phenyl-3,5-diamino-1,2,4-triazol as the diazo component. Heretofore, however, no one has disclosed a disazo type basic dye which uses guanazole (3,5-diamino-1,2,4-triazol) as the starting reactant.

An object of this invention, therefore, is to provide novel disazo compounds.

Another object of this invention is to provide novel basic disazo dyes which provides shades of color which are characterized by high fastness to sunlight, good wash resistance, good rub resistance, and good heat stability.

A further object of this invention is to provide processes for producing the same.

SUMMARY OF THE INVENTION

In accordance with this invention, the following disazo dyes have been provided:

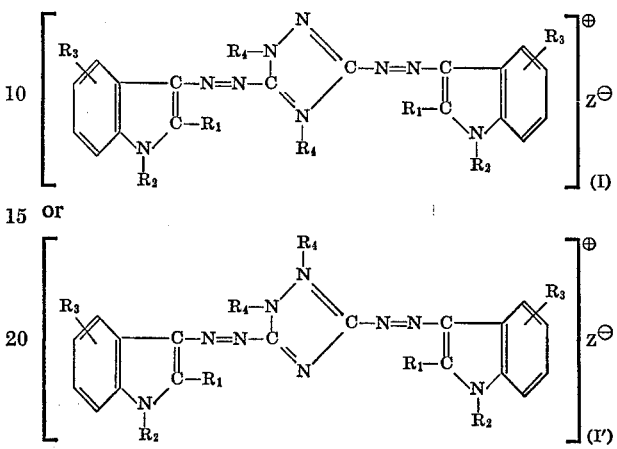

wherein $R_1$ is a lower alkyl radical or a substituted or unsubstituted phenyl radical; $R_2$ represents a hydrogen atom or a lower alkyl radical; $R_3$ represents a hydrogen or halogen atom or a lower alkyl or lower alkoxy radical; $R_4$ represents a lower alkyl or a benzyl radical; $Z^\ominus$ represents an anion.

DETAILED DESCRIPTION OF PREFERRED EMBODIMENTS

The basic disazo dyes of this invention are useful for dyeing fibers such as cotton mordanted with tartar emetic and tannin, cellulose acetate, paper, silk, leather and synthetic fibers which have an acidic group as dye-site, especially fibers made of polyacrylonitrile, polyester, or copolymers thereof. These dyes can provide various brilliant shades of red which have excellent fastness to sunlight, possess good wash and rub resistance, and good heat stability.

The basic disazo dyes of this invention are provided by quaternizing a disazo dye which is free of sulfonic radicals or carbonic radicals, and which is characterized by the general formula:

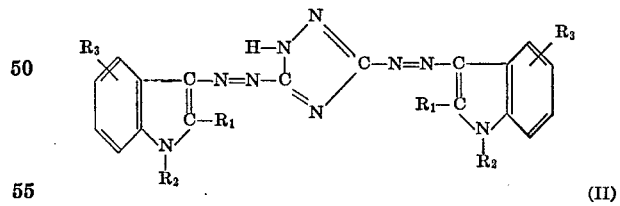

(wherein the definitions of $R_1$, $R_2$, and $R_3$ are as defined above.)

The basic diazo dyes having the general formula:

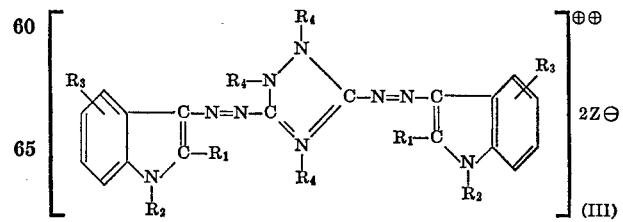

wherein the definitions of $Z^\ominus$, $R_1$, $R_2$, $R_3$ and $R_4$ are as defined above, can also be produced according to this invention by quaternizing the disazo dye (II), with an excess amount of a quaternizing agent. Although the basic disazo dye of formula (I) is produced as the main product, a mixture of dyes of the formulas (I) and (I') can also be produced.

The basic disazo dye of this invention can be produced by quaternizing the disazo dye of formula (II) which is produced by coupling after tetrazotating guanazole. Accordingly, the basic disazo dyes of this invention are quite different in chemical structure from those of the prior art and moreover, they are characterized by an excellent degree of dyeability, excellent fastness to sunlight, excellent wash and rub resistance, and good thermal stability in comparison with the known basic dyes.

In the process of this invention, disazo dyes of the formula (II) can be produced by coupling the tetrazotated guanazole with an indole derivative of the type which does not contain an acid radical which is capable of being dissociated in water. Suitable indole derivatives are those which are known to be useful in the production of azo dyes. The substituents of indole $R_1$ may be selected from the group consisting of lower alkyl radicals, such as methyl, ethyl, propyl, butyl, or substituted or unsubstituted phenyl radicals, including phenyl, p-toluyl, p-chlorophenyl or p-methoxyphenyl radicals. Another substituent of the indole $R_2$ may be selected from the group consisting of hydrogen or lower alkyl, such as methyl, ethyl, propyl or butyl radicals. A third substituent of the indole, $R_3$ can be selected from the group consisting of hydrogen or halogen, lower alkyl or lower alkoxy radicals, such as methyl, ethyl, methoxy, or ethoxy radicals. Typical examples of the indole derivatives used for producing the basic dyes are 2-methyl indole, 1,2-dimethylindole, 1-methyl-2-phenylindole, 1-methyl-2-(4'-methylphenyl)indole, 1,2-dimethyl-5-chloroindole, 1,2,3-trimethylindole, 1-ethyl-2-phenylindole, 1-ethyl-2-phenyl-5-chloroindole, 1-ethyl - 2 - phenyl-5-methoxyindole, 2-phenylindole and 2-ethylindole.

The tetrazotating reaction of guanazole is provided by adding a solution of guanazole in 60% acetic acid, dropwise into nitrosyl sulfuric acid at a temperature of from —5° to 0° C. The coupling reaction is provided by adding a solution of an azo component in a solution of glacial acetic acid into the solution of tetrazonium salt of guanazole. The inorganic acid in the solution is neutralized with ammonium acetate or sodium acetate.

The disazo dye thus produced is then separated by pouring the solution into water and is then quaternized to produce the basic disazo dye of the formula (II). Quaternizing is provided by reacting an alkylating agent or an aralkylating agent with a disazo dye in an inert organic solvent such as benzene, toluene, xylene, chloroform, tetrachloromethane, tetrachloroethane, chlorobenzene, O-dichlorobenzene, dioxane, or dimethylformamide. Instead of the inert solvent, an excess amount of an alkylating agent or an aralkylating agent can be used. Typical alkylating agents include the esters of inorganic acid or organic sulfonic acid, such as dimethyl sulfate, diethyl sulfate, methyl benzene sulfonate, methyl or ethyl p-toluene sulfonate, and the like. Typical aralkylating agents, include benzylchloride.

Although the quaternization reaction is exothermic, it is preferable to initiate the reaction with heat and to maintain a high temperature during the reaction.

The quaternary salt dye produced by this reaction can be precipitated in an inert organic solvent, hence, it can be easily separated by filtration. The dye can alternatively be separated, however, by vacuum or steam distillation to remove the solvent. Where the solvent is compatible with water, the dye in aqueous solution can be separated by salting out. The cationic disazo dye of this invention has an anion which is produced by the strong inorganic acid or the strong organic acid, such as hydrogen chloride, hydrogen bromide, sulfuric acid, benzene sulfonate, toluene sulfonate, or a monoalkyl sulfate. The disazo dyes of this invention are basic dyes which are characterized by a yellowish-red or bluish-red color and are soluble in dilute acetic acid. Accordingly, these dyes are quite suitable for any materials which can be dyed with conventional basic dyes, such as paper, cotton mordanted with tartar emetic and tannin, cellulose acetate, silk, leather and synthetic fibers which have an acidic group as dye-site, especially polyacrylonitrile, polyester and their copolymer type fibers.

When acrylonitrile polymer or copolymer containing fibers are dyed with the basic disazo dye of this invention, it has been found that the dye properties are excellent. The dyes of this invention are characterized by an outstanding fastness to sunlight, and good wash and rub resistance, and they possess good thermal stability. These dyes have very good affinities toward a broad range of fibers from quite high to relatively low, and accordingly, various shades and brightnesses from deep colors to pale colors can be obtained when properly applied. Regardless of the particular shades or brightnesses, however, the colors are always uniform throughout.

Having generally described the invention, a better understanding can now be obtained by reference to certain specific examples which are provided herein for purposes of illustration only and are not meant to be limiting in any manner. All parts and percentages are intended to refer to parts by weight and percentages by weight, unless otherwise specified.

EXAMPLE 1

A solution of 9.9 parts of guanazole in 99 parts of 60% acetic acid, is added dropwise to a mixture of 298 parts of nitrosyl sulfuric acid and 14.7 parts of sodium nitrite, at a temperature of from —5° to 0° C. while stirring. The mixture is stirred for one hour in the presence of an excess amount of nitrous acid to produce the tetrazo compound. After removing the nitrous acid by addition of a small amount of urea, a solution of 270 parts of 2-methylindole and 370 parts of glacial acetic acid is added to the solution of the tetrazonium salt of guanazole at a temperature of from 0° to 2° C. and is reacted for three hours to cause coupling. The coupling mixture is poured into 2,500 parts of ice water and then 430 parts of a 48% aqueous solution of sodium hydroxide is added thereto. The reddish-brown precipitate produced is filtered and dried at a temperature of 70° C.

The disazo dye having the following formula is obtained.

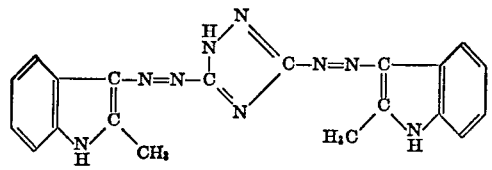

37 parts of this disazo dye is dissolved in 550 parts of dimethylformamide and then 27 parts of dimethyl sulfate is added dropwise at a temperature of 60° C. The mixture is stirred for two hours at 95° C. to effect quaternization. The product thus obtained by quaternizing is poured into 2,000 parts of water and stirred with 5 parts of active carbon at a temperature of 70° to 80° C. The mixture is filtered at an elevated temperature and 200 parts of sodium chloride is added to the filtrate to cause the formation of a precipitate. The red precipitate is filtered and dried at a temperature of 70° C. and 48.2 parts of the quaternary ammonium salt dye having the following formula is obtained.

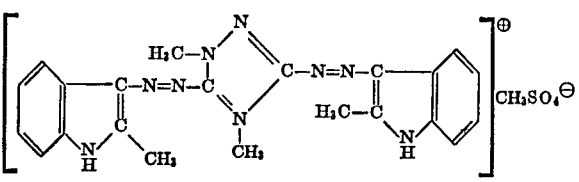

The salt dye is soluble in dilute acetic acid and it appears to have a yellowish-red color in this environment. This dye has been found to be quite effective for polyacrylonitrile type fibers when using a weak acetic dye bath. The bright yellowish-red shades imparted by this dye has an excellent fastness to sunlight, good wash and rub resistance, and a high degree of heat stability. When diethyl sulfate or ethyl p-toluene sulfonate is used instead of dimethyl sulfate in this process, the ethylated dye corresponding to the sale dye is obtained.

When using the following disazo dyes in a similar process as that stated above, similar dyes having similar properties are obtained. The colors described in the following table are produced on polyacrylonitrile type fibers using the respective salt dye.

The following Table refers to disazo dyes of the following formula:

49.7 parts of this disazo dye is dissolved in 700 parts of chlorobenzene and 25.8 parts of dimethyl sulfate is added dropwise thereto at a temperature of 60° C. The mixture is stirred for one hour at 75° to 85° C. to quaternize it. The product thus obtained by quaternizing is poured into 2,000 parts of water and stirred with 5 parts of active carbon at 70° to 80° C. The mixture is then filtered at an elevated temperature and 200 parts of sodium chloride is added to the filtrate to cause the formation of a salt precipitate. The mixture is then cooled to room temperature. The red precipitate is filtered and dried at 70° C.

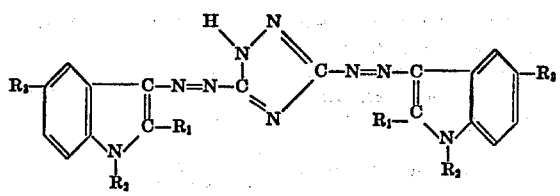

| Example | $R_1$ | $R_2$ | $R_3$ | Dye (parts) | Solvent (parts) | Quaternizing agent (parts) | Color |
|---|---|---|---|---|---|---|---|
| 2 | $CH_3-$ | $CH_3-$ | $H-$ | 38.3 | Dimethylformamide (570) | Dimethyl sulfate (29) | Red. |
| 3 | $-\langle\bigcirc\rangle-CH_3$ | $CH_3-$ | $H-$ | 56.4 | Dimethylformamide (830) | do | Bluish-red. |
| 4 | $CH_3-$ | $CH_3-$ | $CH_3-$ | 43.9 | Dimethylformamide (660) | Dimethyl sulfate (37) | Red. |
| 5 | $-\langle\bigcirc\rangle$ | $C_2H_5-$ | $Cl-$ | 63.3 | Dioxane (900) | Methyl p-toluene sulfonate (46) | Bluish-red. |
| 6 | Same as above | $H-$ | $H-$ | 50.7 | Dimethylformamide (710) | Benzyl chloride (30) | Do. |

EXAMPLE 7

A solution of 9.9 parts of guanazole in 99 parts of 60% acetic acid is added dropwise to a mixture of 298 parts of nitrosyl sulfuric acid and 14.7 parts of sodium nitrite at a temperature of $-5°$ to $0°$ C. while stirring. The mixture is stirred for one hour, in the presence of an excess amount of nitrous acid, to produce the tetrazo compound. After removing the nitrous acid by addition of a small amount of urea, a solution of 43.5 parts of 1-methyl-2-phenyl indole in 500 parts of glacial acetic acid is added to the solution of tetrazonium salt of guanazole at a temperature of $0°$ to $2°$ C. and the mixture is reacted for three hours to cause coupling. The coupled mixture is poured into 2,500 parts of ice water and then 430 parts of 48% aqueous solution of sodium hydroxide is added thereto. The reddish-brown precipitate produced is filtered and dried at $70°$ C.

The disazo dye having the following formula is obtained:

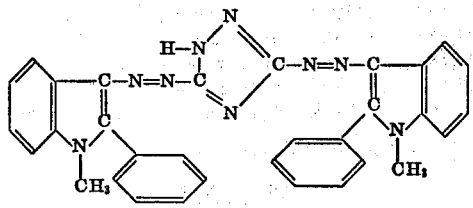

and 59 parts of the quaternary ammonium salt dye having the following formula is obtained:

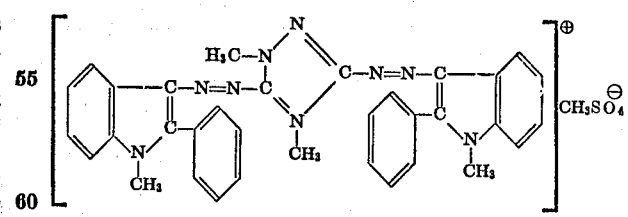

The salt dye is soluble in dilute acetic acid and provides a bluish-red color in that solution. It is capable of dyeing polyacrylonitrile type fiber from a weak acetic dye bath and provides bright bluish-red shade colors which have excellent fastness to sunlight, excellent wash and rub resistance, and excellent heat stability. Where diethyl sulfate is used instead of the dimethyl sulfate in this process, the ethylated dye corresponding to the salt dye is obtained. When using the following disazo dyes in a similar process as that stated above, similar salt dyes having similar properties are obtained. The colors described in the following table are produced on polyacrylonitrile type fibers using the respective salt dye.

The following table refers to disazo dyes of the following formula:

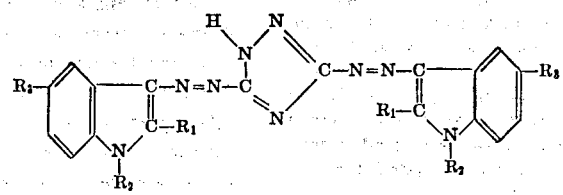

| Example | $R_1$ | $R_2$ | $R_3$ | Dye (parts) | Solvent (parts) | Quaternizing agent (parts) | Color |
|---|---|---|---|---|---|---|---|
| 8 | $CH_3$— | $CH_3$— | Cl— | 48.0 | Xylene (700) | Diethyl sulfate (37) | Red. |
| 9 | phenyl | $C_2H_5$— | $CH_3O$— | 62.4 | Benzene (800) | Ethyl p-toluene sulfonate (50) | Bluish-red. |
| 10 | $C_2H_5$ | H— | H— | 38.7 | O-dichlorobenzene (600) | Methyl benzene sulfonate (42) | Do. |

Having now specifically described the invention, it will be readily apparent to those of ordinary skill in the art that many changes and modifications can be made without departing from the spirit or scope of the invention.

Accordingly, what is claimed and intended to be covered by Letters Patent is:

1. A basic disazo dye having the formula selected from the group consisting of:

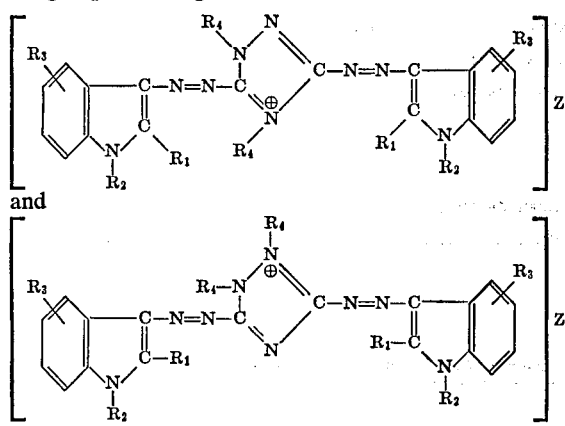

wherein $R_1$ represents lower alkyl, or phenyl or phenyl-substituted with a substituent selected from the group consisting of lower alkyl, lower alkoxy, and halogen; $R_1$ represents hydrogen and lower alkyl; $R_3$ represents hydrogen, halogen, lower alkyl, and lower alkoxy; $R_4$ represents lower alkyl and benzyl; $Z^\ominus$ represents an anion.

2. A basic disazo dye having the formula selected from the group consisting of:

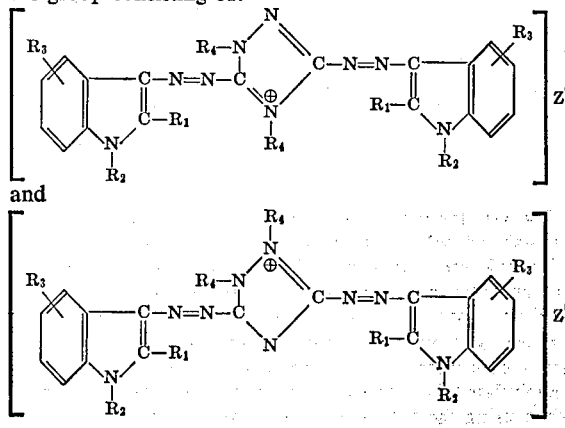

wherein $R_1$ represents lower alkyl, phenyl, p-toluyl, p-chlorophenyl, or p-methoxyphenyl; $R_2$ represents hydrogen and lower alkyl; $R_3$ represents hydrogen, chlorine, bromine, lower alkyl, and lower alkoxy; $R_4$ represents lower alkyl and benzyl; $Z^\ominus$ represents an anion.

3. The basic disazo dye of Claim 1 represented by:

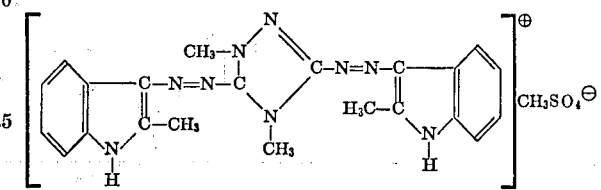

4. The basic disazo dye of Claim 1 represented by:

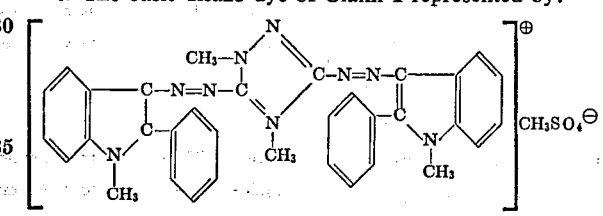

5. The basic disazo dye of Claim 1 represented by:

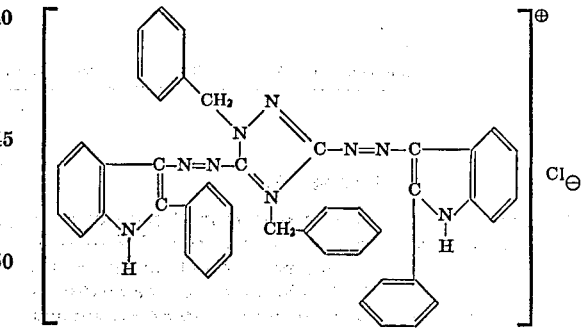

6. The basic disazo dye of Claim 1 represented by:

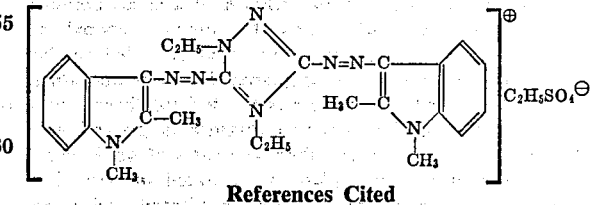

References Cited
UNITED STATES PATENTS

| 3,148,935 | 9/1964 | Pfitzner et al. | 260—157 X |
| 2,883,373 | 4/1959 | Bossard et al. | 260—157 X |
| 3,078,137 | 2/1963 | Baumann et al. | 260—157 X |
| 3,101,988 | 8/1963 | Bossard et al. | 260—157 X |
| 3,291,788 | 12/1966 | Yamaya et al. | 260—157 |
| 3,360,508 | 12/1967 | Sureau et al. | 260—157 X |
| 3,438,963 | 4/1969 | Robbins | 260—157 |

FLOYD D. HIGEL, Primary Examiner

U.S. Cl. X.R.

260—141, 165

UNITED STATES PATENT OFFICE
CERTIFICATE OF CORRECTION

Patent No. 3,822,247   Dated July 2, 1974

Inventor(s) Minoru Ozutsumi et al.

It is certified that error appears in the above-identified patent and that said Letters Patent are hereby corrected as shown below:

Column 1, lines 25-35 the formula should appear as shown below:

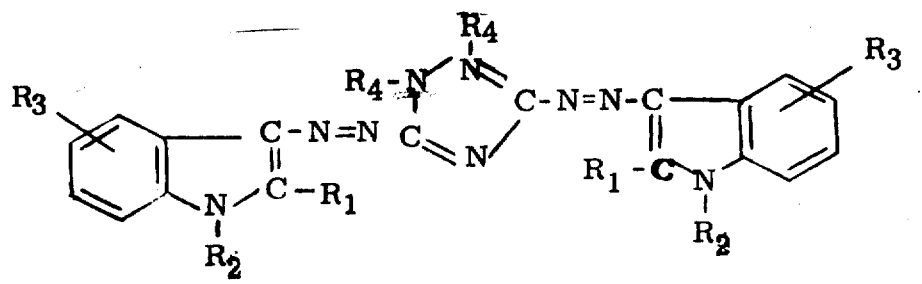

Column 7, line 47, "$R_1$" should read -- $R_2$ --.

Signed and sealed this 14th day of January 1975.

(SEAL)
Attest:

McCOY M. GIBSON JR.
Attesting Officer

C. MARSHALL DANN
Commissioner of Patents